United States Patent [19]

Ebizuka

[11] Patent Number: 5,101,337
[45] Date of Patent: Mar. 31, 1992

[54] PLANT DIAGNOSTIC APPARATUS

[75] Inventor: Kiyoshi Ebizuka, Hyogo, Japan

[73] Assignee: Mitsubishi Denki Kabushiki Kaisha, Tokyo, Japan

[21] Appl. No.: 432,863

[22] Filed: Nov. 7, 1989

[30] Foreign Application Priority Data

Nov. 9, 1988 [JP] Japan .................. 63-284420

[51] Int. Cl.$^5$ .................................... G06F 15/46
[52] U.S. Cl. ..................... 364/184; 364/150; 364/186
[58] Field of Search ............... 364/149, 150, 550, 578, 364/492, 493, 494, 495, 184–187

[56] References Cited

U.S. PATENT DOCUMENTS

| | | | |
|---|---|---|---|
| 4,517,468 | 5/1985 | Kemper et al. | 364/492 |
| 4,604,718 | 8/1986 | Norman et al. | 364/150 |
| 4,642,782 | 2/1987 | Kemper et al. | 364/550 |
| 4,644,479 | 2/1987 | Kemper et al. | 364/550 |
| 4,734,869 | 3/1988 | Mickowski | 364/550 |
| 4,755,925 | 7/1988 | Tsuchiya et al. | 364/150 |
| 4,791,548 | 12/1988 | Yoshikawa et al. | 364/149 |
| 4,841,456 | 6/1989 | Hogan, Jr. et al. | 364/550 |
| 4,878,179 | 10/1989 | Larsen et al. | 364/490 |
| 4,937,765 | 6/1990 | Shupe et al. | 364/578 |
| 4,967,337 | 10/1990 | English et al. | 364/184 |
| 5,023,045 | 6/1991 | Watanabe et al. | 364/184 |

FOREIGN PATENT DOCUMENTS

59-117609 7/1984 Japan .

Primary Examiner—Jerry Smith
Assistant Examiner—Thomas E. Brown
Attorney, Agent, or Firm—Rothwell, Figg, Ernst & Kurz

[57] ABSTRACT

A plant diagnostic apparatus for determining the cause of a fault in a power plant or the like displays a simulation fault value based on an estimated fault and therefore the diagnostic probability of the displayed cause of the fault to be the correct cause can be improved. Moreover, since an estimated fault, a fault period simulation value of the case that an estimated fault progresses and a normal period simulation value of the case that no fault occurs are displayed on the same screen, a simulation value of the estimated fault and normal value can be compared for judgment and thereby the diagnostic probability of the correctness of the decision of the estimated fault can be improved. In addition, since an estimated fault, a simulation value due to the estimated fault and a simulation value of the case that a counter measure is taken to correct the estimated fault are displayed on the same screen, the probability of the decision of the estimated fault being correct can be improved by comparing these values.

3 Claims, 8 Drawing Sheets

PLANT DIAGNOSTIC APPARATUS

BACKGROUND OF THE INVENTION

1. Field of the Invention

The present invention relates to a plant diagnostic apparatus and particularly to a diagnostic apparatus which estimates a failure occurring in a power plant or the like and displays simulation value for progress of such failure for convenience of taking measures.

2. Description of the Prior Art

Figure 1:
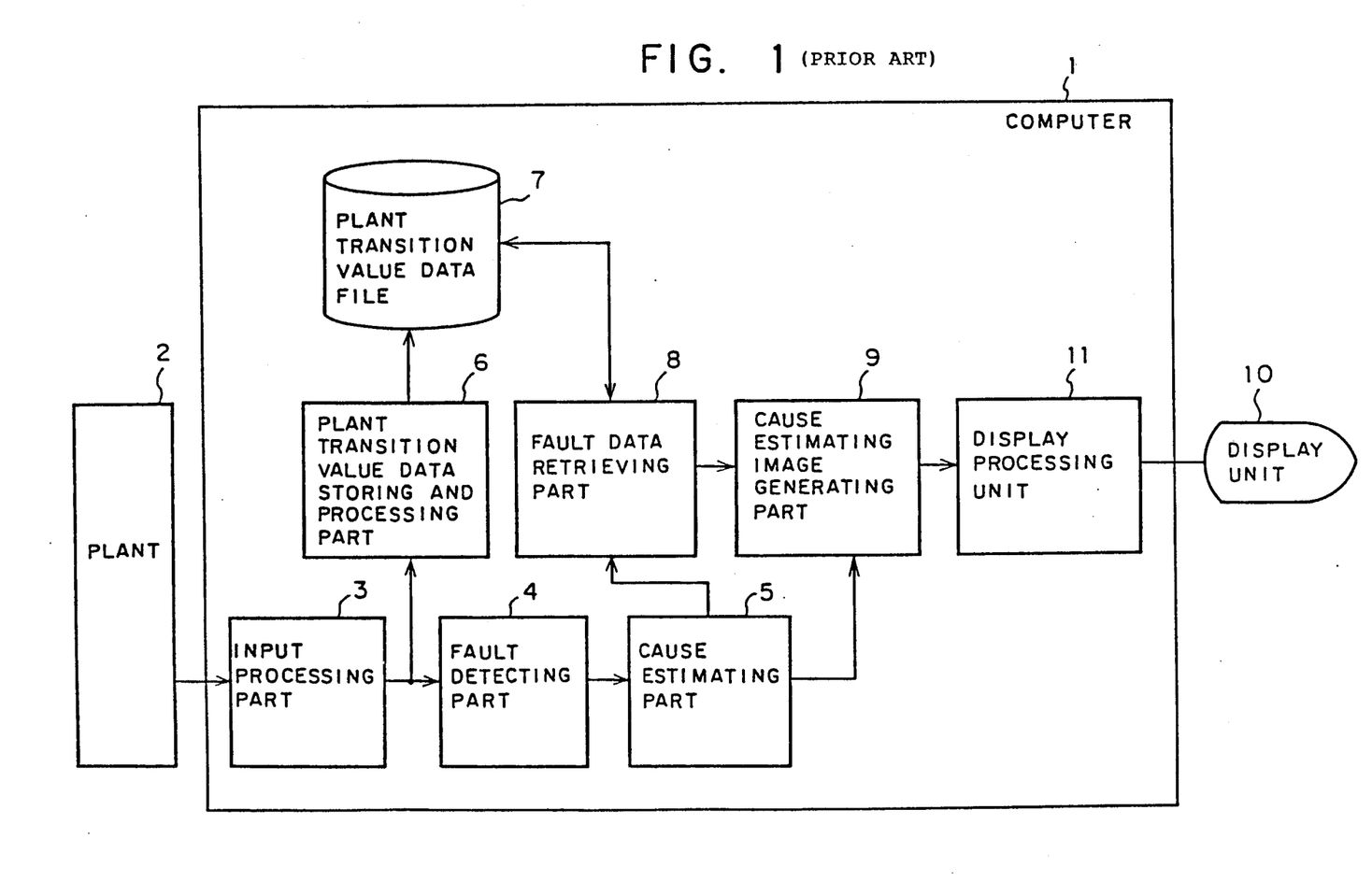
FIG. 1 is a block diagram showing configuration of a plant diagnostic apparatus in the prior art.

FIG. 1 is a block diagram showing a diagnostic apparatus of the prior art. In this figure, an electronic computer 1 comprises an input processing part 3 for inputting a process quantity from a plant 2, a fault detecting part 4 for detecting a fault in the input data, a cause diagnosing part 5 for estimating a cause of the fault from fault phenomenon detected by the fault detecting part 4, a plant transition value data, storing and processing part 6 for storing plant transition data, a plant transition value data file 7, a fault data retrieving part 8, a cause estimating image generating part 9 and a display processing part 11 for displaying data to a display unit 10.

Figure 2:
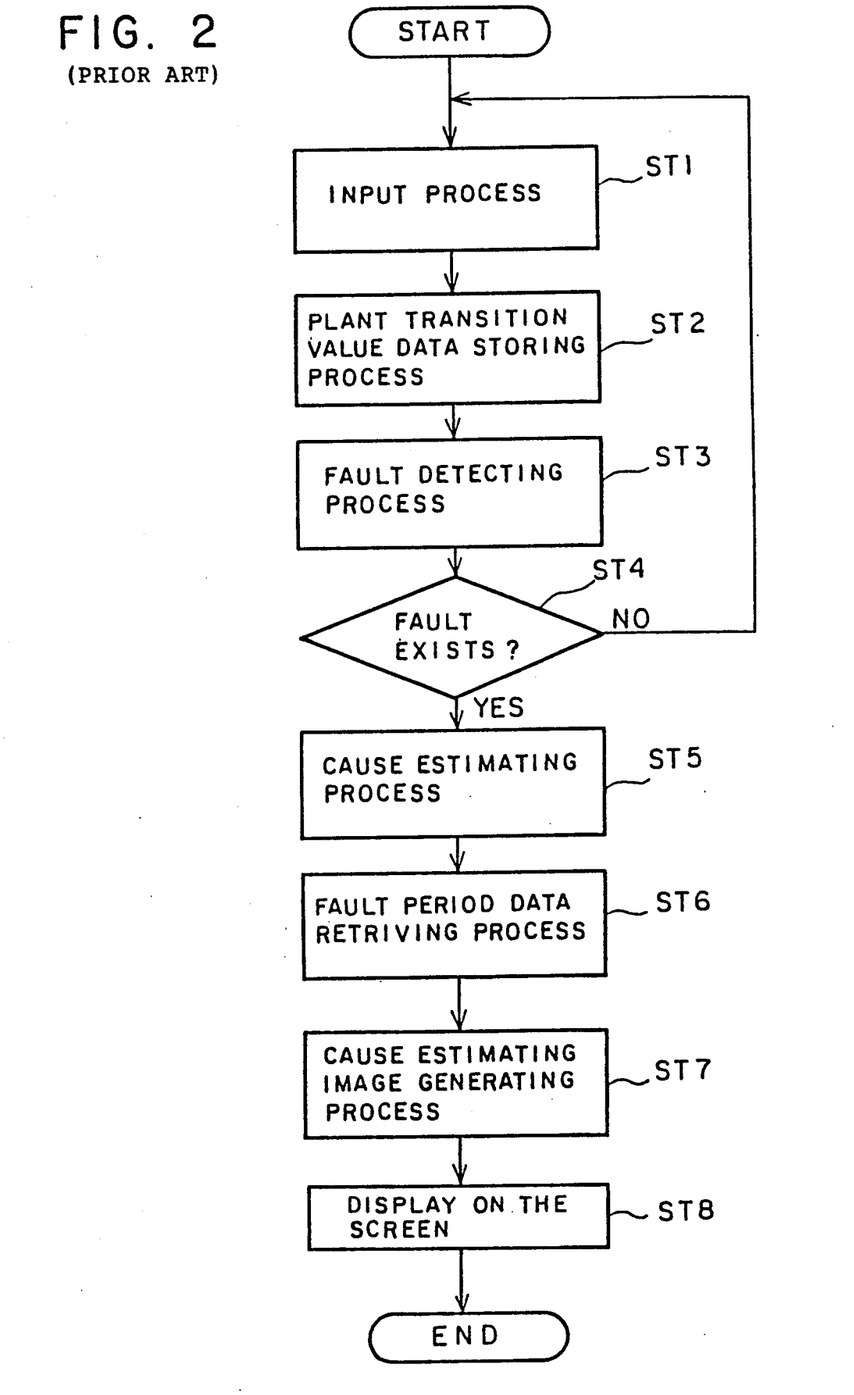
FIG. 2 is a flowchart indicating operation of the apparatus shown in FIG. 1.

FIG. 2 is a flowchart indicating processes for displaying cause estimation and estimated cause in the plant diagnostic apparatus of the prior art.

In the plant diagnostic apparatus of the prior art, input data from the plant 2 is subjected to an input process (step ST1) in the input processing part 3 and is sent to the plant transition value data storing and processing part 6 for carrying out a plant transition value data storing process (step ST2) in order to store the transition data in a plant transition data file 7. The input data having completed the input process (steps ST1 and ST2) is then sent to the fault detecting part 4 to monitor changes in the value of input data. If the input data deviates from a normal condition, a fault detection process (step ST3) is carried out to detect the occurrence of a fault condition. If a fault condition is detected, the cause estimation process (step ST5) is carried out in the cause estimating part 5. When a fault condition is not detected, monitoring is continued.

The cause estimating part 5 estimates a cause of a detected fault event. The cause data estimated here, together with the fault data having passed a fault period data retrieving process (step ST6) under the fault condition in the fault data retrieving part 8, are sent to the cause estimating image generating part 9 and subjected to a cause estimation image generating process (step ST7). An image generated is displayed (step ST8) on the display unit 10 through the display processing unit 11.

The plant diagnostic apparatus of the prior art has arrangements described above and has the following problems when the estimated cause is displayed.

(a) It has been impossible to know whether or not the plant data has truly been changed to the detected condition by the estimated cause.

(b) It is impossible to know the plant conditions under normal operation.

(c) It is impossible to know how the plant condition changes when counter measures are taken to compensate for faults.

SUMMARY OF THE INVENTION

The present invention overcomes these problems and it is therefore an object of the present invention to provide a diagnostic apparatus which comprises a plant characteristic model for normal operation and confirms an estimation result of cause by simulating a fault model corresponding to the estimated cause of fault condition.

Moreover, it is also another object of the present invention to provide a diagnostic apparatus which comprises a plant characteristic model under the normal operation and confirms an estimated cause of fault by stimulating a fault model corresponding to the estimated cause of fault operation and a normal model under the normal operation.

It is still another object of the present invention to provide a diagnostic apparatus which comprises a plant characteristic model under normal operation and confirms an estimated cause of fault operation and plant operation after a counter measure is taken by simulating a fault model corresponding to the estimated cause of fault operation and the model after the counter measure is taken.

In order to achieve these objects of the present invention, a plant diagnostic apparatus according to one embodiment of the present invention comprises a plant characteristic model for storing characteristics of a plant, a fault period simulation control part for calculating a simulation value corresponding to a fault estimated by the data from the plant characteristic model, from the plant transition data file and from the fault estimating part, a simulation image generating part for generating an image of calculated value, and a display processing part for displaying and controlling the generated image on the display unit A plant diagnostic apparatus according to another embodiment of the present invention comprises a plant characteristic model, a normal period simulation control part for calculating a value under normal operation without any fault based on the data from the plant characteristic model, plant transition data file and cause estimating part and a fault period simulation control part for calculating a value under estimated fault, a simulation image generating part for generating image of calculated values of both normal period and fault period simulation control parts, and a display processing part for displaying and controlling a generated image on the display unit.

Moreover, a plant diagnostic apparatus according to still another embodiment of the present invention comprises a plant characteristic model, a cause and counter measure estimating part for estimating a cause based on the fault detected a fault detecting part and also estimating a counter measure corresponding to the fault, a fault/measure simulation control part for calculating a simulation value in case a counter measure is taken for estimated fault using, the data from the plant characteristic model, the plant transition data file and the cause and measure estimating part, a simulation image generating part for generating image for displaying simulation value, and a display processing part for displaying and controlling simulation image and cause estimating image on the display unit.

These and other objects of the present invention will become apparent from the following description taken in conjunction with the preferred embodiments thereof with reference to the accompanying drawings.

DETAILED DESCRIPTION OF THE PREFERRED EMBODIMENTS

Each embodiment of the present invention will be explained in further detail depending on the embodiments shown in FIG. 3 to FIG. 8.

Figure 3:
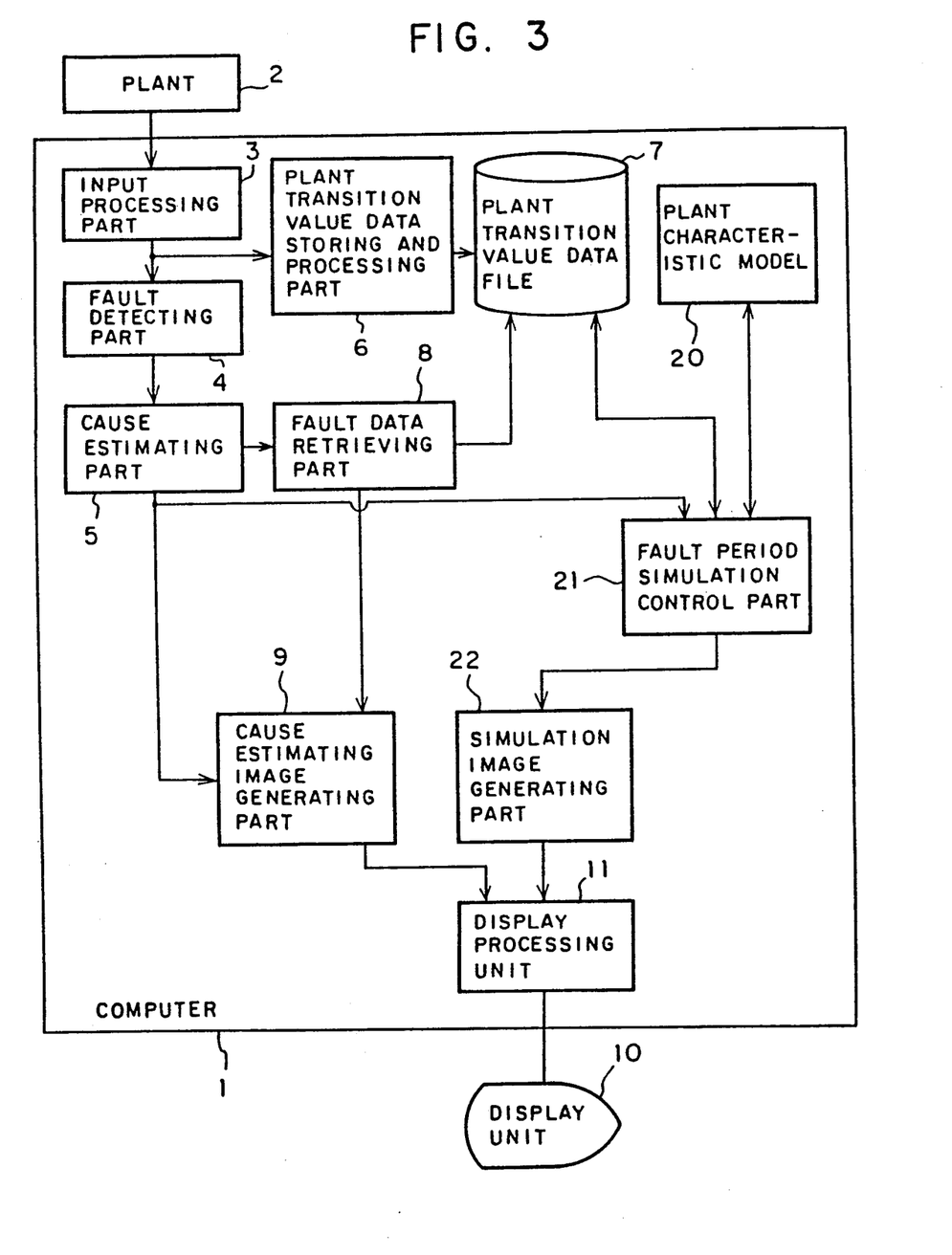
FIG. 3 is a block diagram indicating configuration of a plant diagnostic apparatus according to a first embodiment of the present invention.

In FIG. 3, an electronic computer 1 comprises an input processing part 3 for inputting process quantity data from a plant 2, a fault detecting part 4 for detecting a fault in the input data, a cause estimating part 5 for diagnosing a cause of fault from fault phenomenon detected by the fault detecting part 4, a plant transition value data storing and processing part 6 for storing plant data, a plant transition value data file 7, a fault data retrieving part 8, a cause estimating image generating part 9 and a display processing part 11 for displaying data on a display unit 10.

Figure 4:
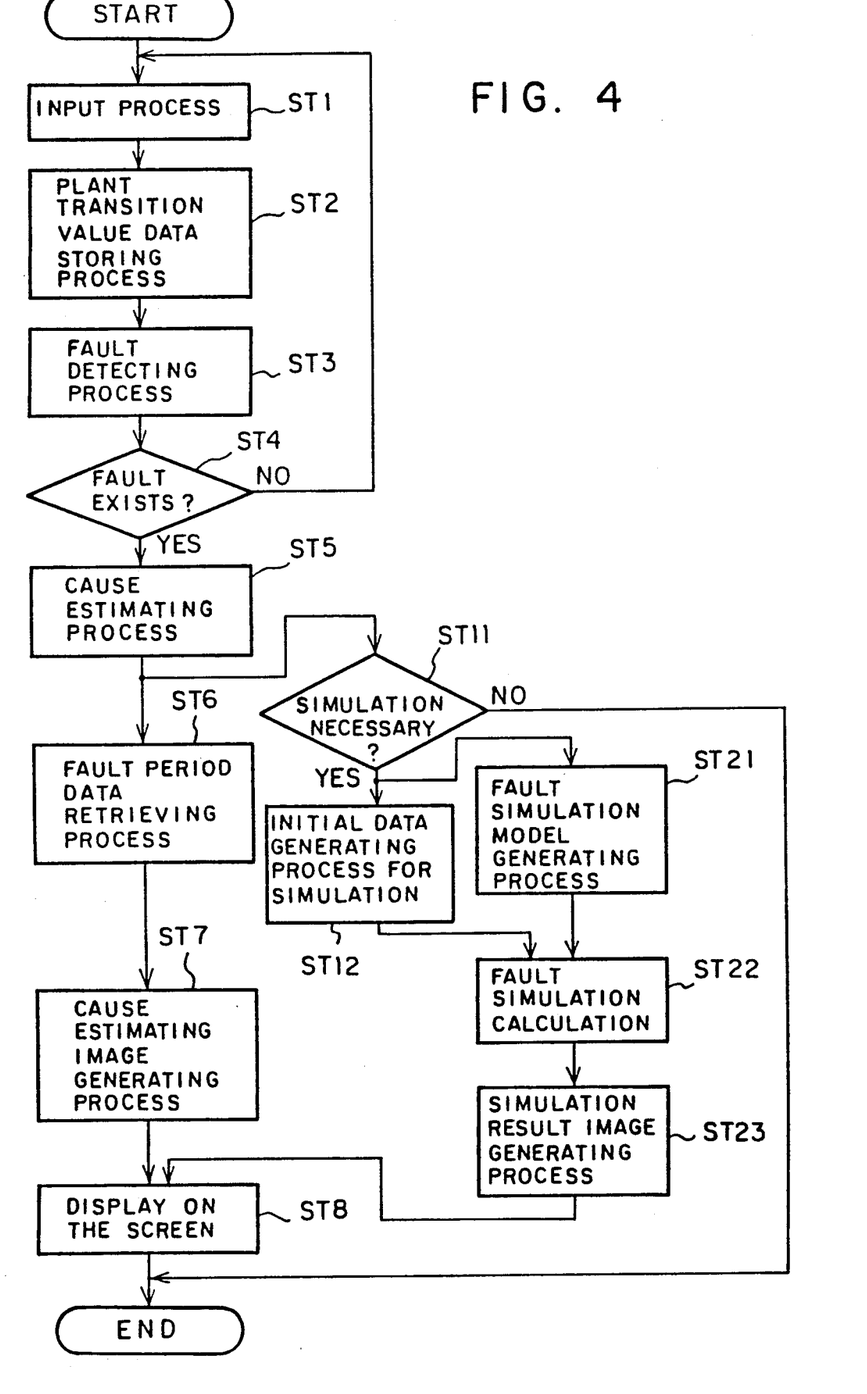
FIG. 4 is a flowchart indicating operation of the apparatus shown in FIG. 3.

In addition to these conventional components, the apparatus of the first embodiment of the present invention comprises a plant characteristic model 20 for storing various characteristics of the plant, a fault period simulation control part 21 for calculating a simulation value when the estimated fault occurs, and a simulation image generating part 22 for generating a display image of such simulation value, and performs the operations indicated by the flowchart shown in FIG. 4.

In FIG. 4, the input data from the plant 2 is subjected to an input process (step ST1) in the input processing part 3, the data is then processed by a plant transition value data storing process (step ST2) in the plant transition value data storing and processing part 6, and is then stored in the plant transition value, data file 7. Next, the fault detecting part 4 checks for changes in the input data and executes a fault detecting process (step ST3) which detects a fault if operation deviates from the normal condition. When a fault is detected, a cause estimating process (step ST5) is carried out in the cause estimating part 5 and the cause of the fault may be estimated from the fault event detected. The estimated cause is sent to the estimated cause image generating part 9 together with fault-associated data retrieved by a fault period data retrieving process (step ST6) in the fault data retrieving part 8. Such data are processed and edited by a cause estimating image generating process (step ST7) and are then displayed on the display unit by a display process (step ST8). Next, the fault simulation model generating process (step ST21) is carried out in the fault period simulation control part 21 in such a case that simulation is required on the basis of the operator's judgment or predetermined judging criteria (step ST11). A model for the range of conditions associated with the fault is extracted and reconstructed from the reference plant characteristic model 20. More specifically, a fault simulation model including the change of plant characteristic from the normal condition to fault condition is generated at step 21 and the initial data required for the simulation model is generated by the initial data generating process (step ST12) from the plant transition value data file 7. Thereafter, the simulation result of a fault simulation calculation (step ST22) is sent to the plant data simulation image generating part 22. This data is processed and edited by a simulation result image generating process (step ST23) and is then displayed on the display unit by the display process (step ST8).

In the above embodiment, a simulation model has been generated for the estimated cause of a fault but it is also possible to generate a simulation model for an arbitrarily designated cause.

Moreover, while in the above embodiment, a result of fault simulation is displayed in a format that is convenient to decision making, a process for estimating another cause may be performed by using the simulation result.

Figure 5:
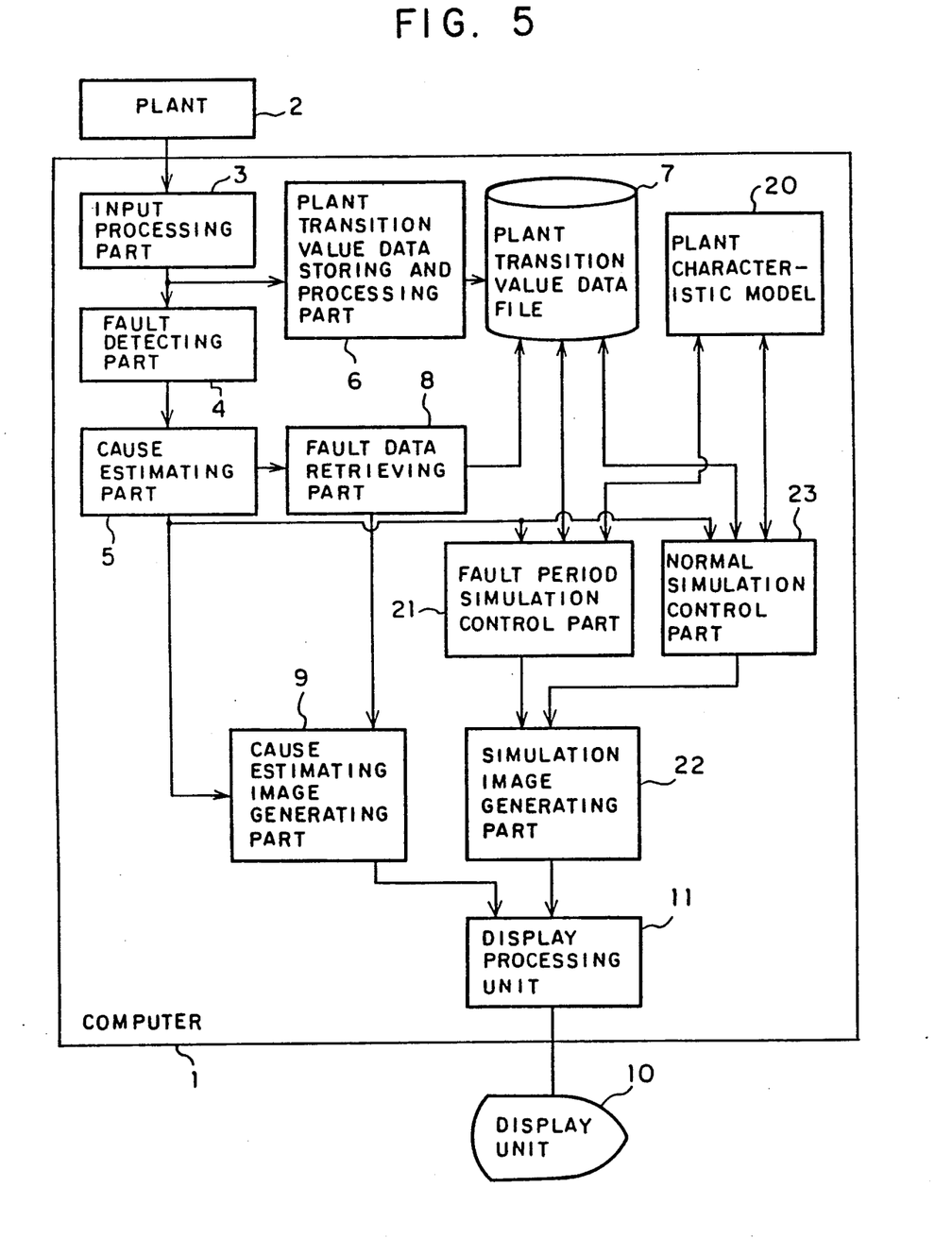
FIG. 5 is a block diagram indicating the configuration of a plant diagnostic apparatus according to a second embodiment of the present invention.
Figure 6:
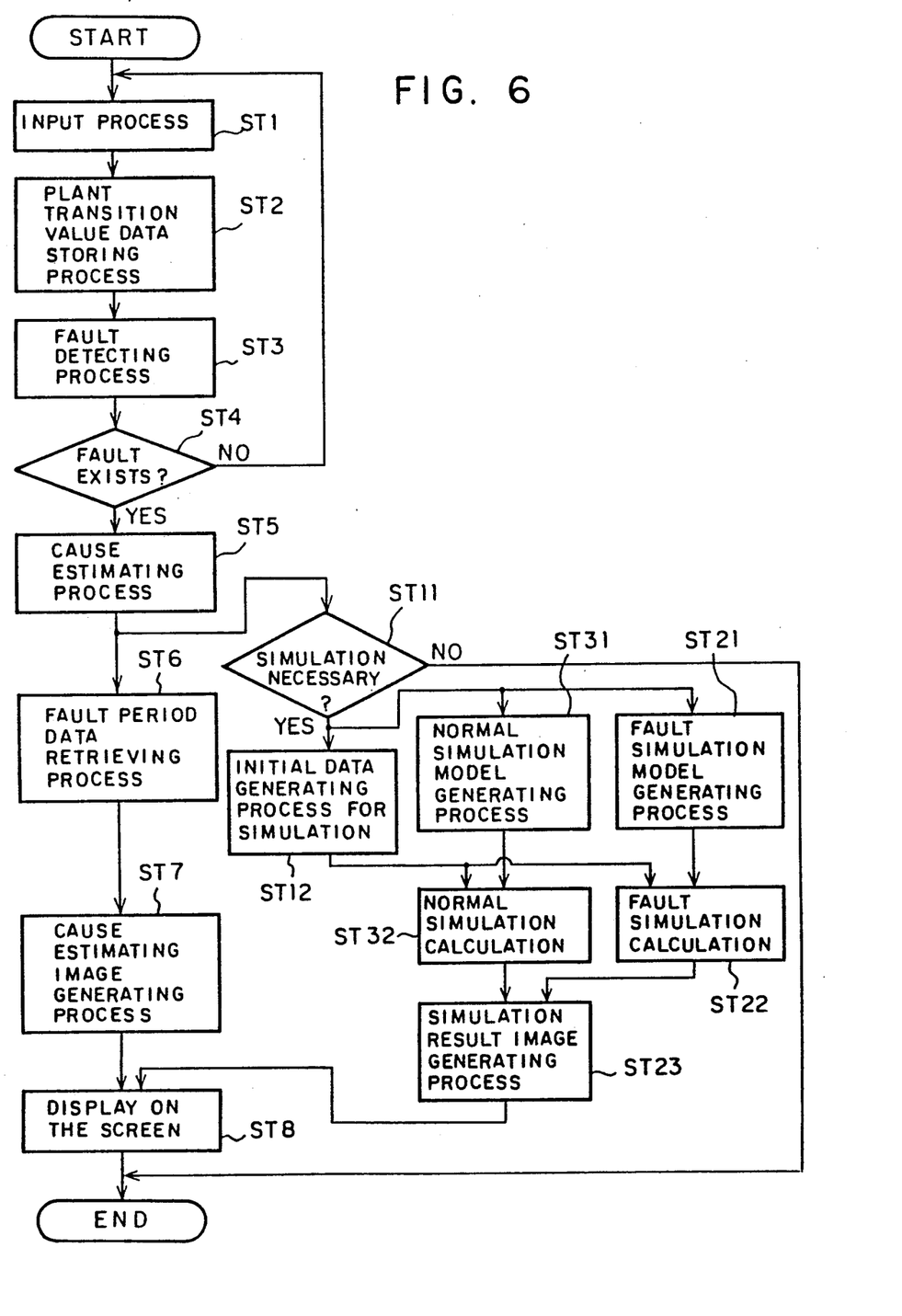
FIG. 6 is a flowchart indicating operation of the apparatus shown in FIG. 5.

According to the second embodiment of the present invention, an electronic computer 1 comprises, as shown in FIG. 5, a plant characteristic model 20, a fault period simulation control part 21, a simulation image generating part 22 and a normal simulation control part 23, in addition to the prior art configuration of FIG. 1 and operates as indicated in the flowchart of FIG. 6.

In FIG. 6, an input data from the plant 2 is subjected to the input process (step ST1) in the input processing part 3, and to the plant transition value data storing process (step ST2) in the plant transition data storing and processing part 6, and is then stored in the plant transition value data file 7. In addition, the fault detecting part 4 monitors changes in input data and carries out the fault detecting process (step ST3) for detecting a fault when operation deviates from normal conditions. When a fault is detected, the cause estimating part 5 starts the cause estimating process (step ST5) to estimate a cause of the fault from the detected fault event. The estimated cause is sent to the cause estimating image generating part 9 together with data associated with fault retrieved by the fault period data retrieving process (step ST6) in the fault period data retrieving part 8. The estimated cause data is then processed and edited by the cause estimating image generating process (step ST7), and is finally displayed on the display unit by the display process (step ST8).

In addition, if simulation is performed by operator's decision or by predetermined decision criteria, the normal simulation control part 23 carries out a normal simulation model generating process (step ST31) and generates a normal period simulation model for the range of conditions associated with a fault from the standard plant characteristic model 20. The fault period simulation control part 21 generates a fault simulation model (step ST21) including changes in the plant characteristics from the normal condition to the fault condition. In addition to the normal simulation model generation, initial data is generated from the plant transition value data file 7 by the initial data generating process (step ST12). A normal simulation calculation (step ST32) and fault simulation calculation (step ST22) are performed, the simulation result plant data is sent to the simulation image generating part 22 and this plant data is processed and edited by a simulation result image generating process (step ST23) and is finally displayed on the display unit by the display process (step ST8).

Figure 7:
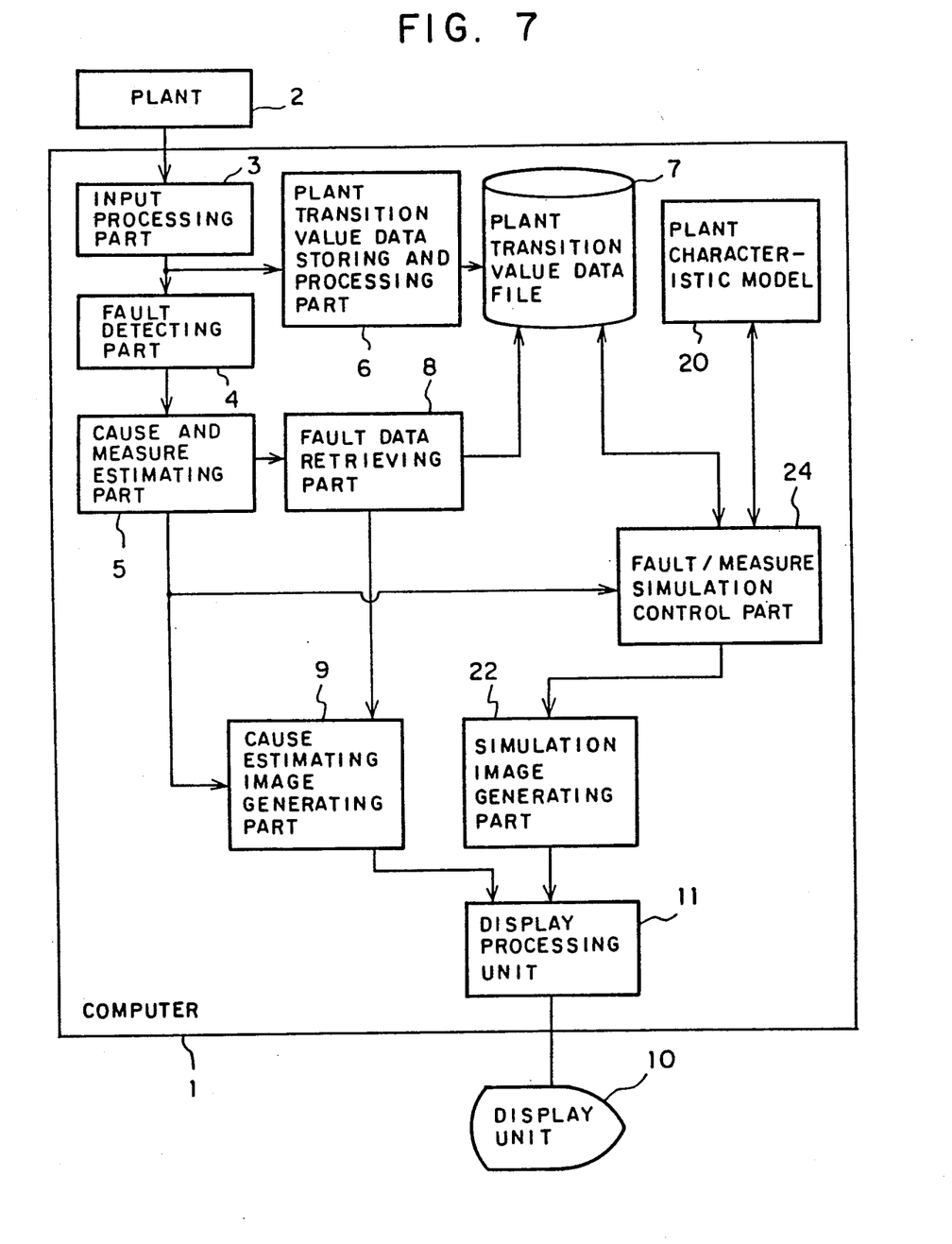
FIG. 7 is a block diagram indicating the configuration of a plant diagnostic apparatus according to a third embodiment of the present invention.

In the claim third embodiment of the present invention, an electronic computer 1 comprises, in addition to the configuration of the prior art, a plant characteristic model 20, a simulation image generating part 22 and a fault/measure simulation control part 24 as shown in FIG. 7. Thereby the computer 1 is capable of displaying the simulation result from the estimated fault and the simulation result when a counter measure is taken for such estimated fault on the display unit through the operations indicated in the flowchart of FIG. 8.

Figure 8:
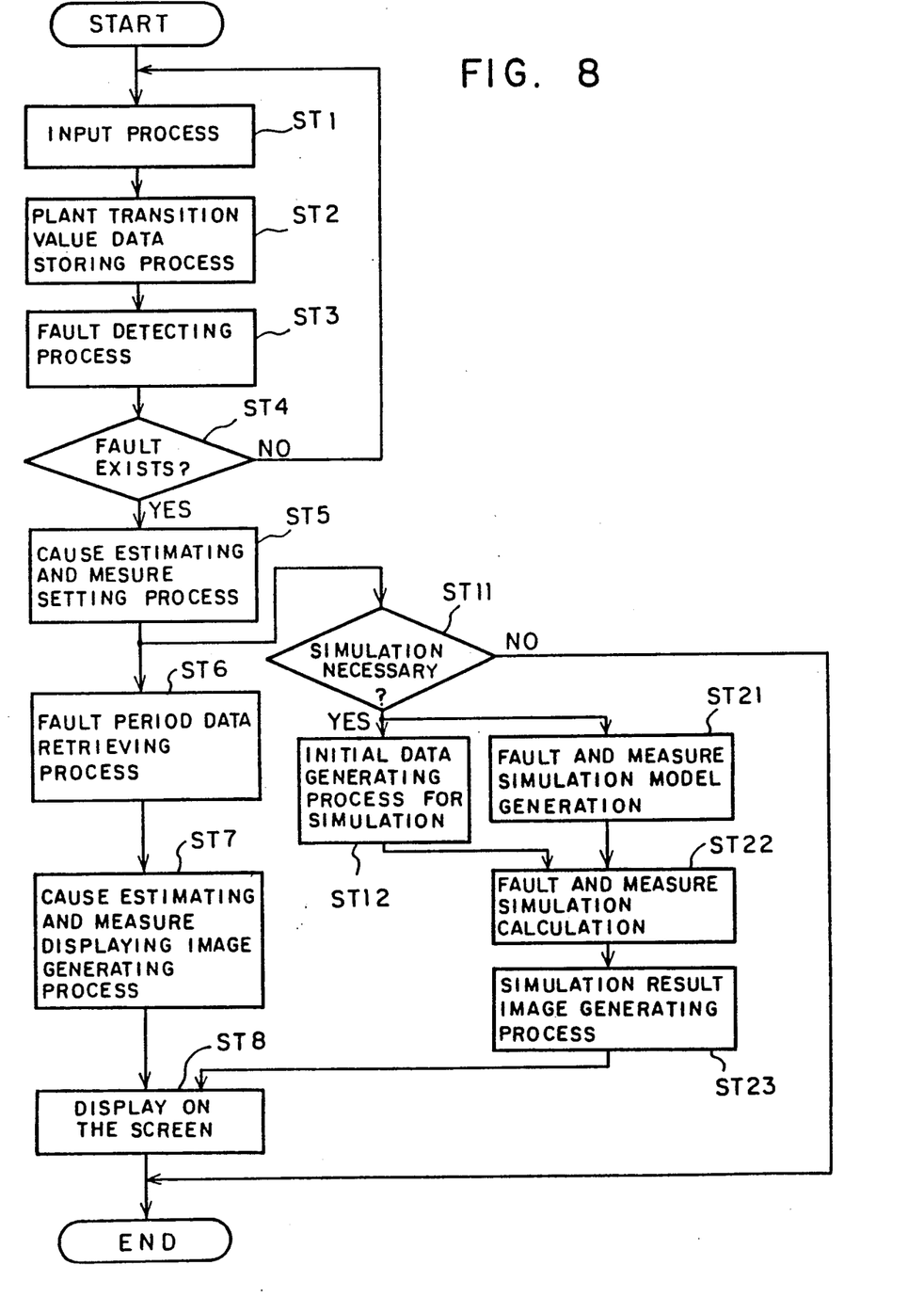
FIG. 8 is a flowchart indicating operation of the apparatus shown in FIG. 7.

In FIG. 8, the input data from plant 2 is subjected to the input process (step ST1) in the input process part 3, then to the plant transition value data storing process (step ST2) in the plant transition value data storing and processing part 6, and is stored in the plant transition value data storing file 7. Next, the fault detecting part 4 monitors changes in the input data and executes the fault detecting process (step ST3) for detecting a fault when operation deviates from the normal condition. When a fault is detected, the cause and measure estimating part 5 starts a cause and measure estimating process (step ST5). The cause of fault is estimated and a measure to be taken is set according to the fault detected The estimated cause and measure are sent to the cause estimating image generating part 9 together with the data associated with the fault detected by the fault period data retrieving process (step ST6), processed and edited by the cause and measure estimating image generating process (step ST7) and finally displayed on the display unit by the display process (step ST8).

Moreover, when simulation is required based on operator's judgment or predetermined judging criteria (step ST11), a model for the range of conditions associated with fault is extracted from the reference plant characteristic model 20 by the fault and measure simulation model generating process (step ST21) in the fault/measure simulation control part 24. A fault/measure simulation model, which also covers sudden changes in plant characteristics from normal condition to fault condition by taking a measure, is generated, the initial data necessary for the simulation model is generated by the initial data generating process (step ST12) from the plant transition value data file 7, the fault/measure simulation calculation process (step ST22) is carried out and the simulated plant data operation is processed and edited by the simulation result image generating process (step ST23) and is displayed on the display unit by the display process (step ST8).

As described, according to the present invention, (a) an estimated fault and simulation result by estimated fault are displayed, or (b) an estimated fault, simulation result by estimated fault and normal period simulation result without fault are displayed, and moreover (c) an estimated fault, simulation result by estimated fault and simulation result when a measure is taken are displayed, and thereby the probability of the estimated fault being the actual fault can be improved.

The present invention is not limited to the embodiments described above and covers, for example, other changes and modifications such as executing a process for estimating other causes of fault by comparison with the simulation result of arbitrarily designated fault or with simulation result after taking a desired measure and utilizing the simulation result obtained.

As described above, the present invention provides the following effects. That is, according to the first embodiment, the simulation result in a case where an estimated cause occurs can automatically be displayed. According to claim 2, the simulation result in a case where an estimated cause occurs, the simulation result of normal operation without fault can automatically be calculated, and moreover according to the third embodiment, the simulation result in a case where an estimated cause occurs, the simulation result in a case where a measure is taken for the fault is automatically calculated and displayed on the display unit. Thereby, the time for estimating a cause of fault can be shortened, and reliability of cause estimation can be improved. In the case of the third embodiment, moreover, reliability for safe operation of plant by taking a measure can also be improved.

What is claimed is:

1. A plant diagnostic apparatus for determining a cause of a fault in a power plant or the like, comprising:
   a plant characteristic model for storing plant characteristics;
   input processing means for inputting data from the plant;
   a plant transition data file for storing transition values of plant characteristics based on data from the input processing means;
   fault detecting means for detecting a fault in the plant based on the data from said input processing means;
   cause estimating means for estimating a cause of the fault from a fault event detected by the fault detecting means;
   cause estimating image generating means for generating an image to be displayed by the data from the cause estimating means;
   fault period simulation control means for calculating an estimated fault simulation value based upon the data from the plant characteristic model from the plant transition data file and from the cause estimating means;
   simulation image generating means for generating an image of the simulation value calculated by the fault period simulation control means;
   display processing means for displaying and controlling the images generated by the simulation image generating means and by the cause estimating image generating means; and
   a display unit for displaying the estimated fault and the estimated fault simulation value under the control of said display processing means.

2. A plant diagnostic apparatus for determining a cause of a fault in a power plant or the like, comprising:
   a plant characteristic model for storing plant characteristics;
   input processing means for inputting data from the plant;
   a plant transition data file for storing transition values of plant characteristics based on data from the input processing means;
   fault detecting means for detecting a fault in the plant based on the data from said input processing means;
   cause estimating means for estimating a cause of the fault from a fault event detected by the fault detecting means;
   cause estimating image generating means for generating an image to be displayed by data from the cause estimating means;
   normal period simulation control means for calculating a normal period simulation value in the absence of a fault based on the data from the plant characteristic model, from the plant transition data file
and from the cause estimating means;

fault period simulation control means for calculating
an estimated fault simulation value based on the
data from the plant characteristic model, from the
plant transition data file and from the cause estimating
means;

simulation image generating means for generating an
image of the simulation values calculated by the
fault period simulation control means and by the
normal period simulation control means respectively;

display processing means for displaying and controlling
the images generated by the simulation image
generating means and by the cause estimating
image generating means; and a display unit for displaying the estimated cause of the
fault, the normal period simulation value and the
simulation value due to the estimated fault under
the control of the display processing means.

3. A plant diagnostic apparatus for determining a
cause of a fault in a power plant or the like, comprising:

a plant characteristic model for storing plant characteristics;

input processing means for inputting data from the
plant;

a plant transition data file for storing transition values
of plant characteristics based on data from the
input processing means;

fault detecting means for detecting a fault in the plant
based on the data from said input processing means;

cause and measure estimating means for estimating a
cause and a counter measure to be taken based on a
fault event detected by said fault detecting means;

cause estimating image generating means for generating
an image to be displayed by data from the cause
and measure estimating means;

fault/measure simulation control means for calculating
a simulation value of a case where the estimated
counter measure is taken for the estimated fault
based on the data from the plant characteristic
model, from the plant transition data file and from
the cause and measure estimating means;

simulation image generating means for generating an
image to be displayed by the data from the fault-
/measure simulation control means;

display processing means for displaying and controlling
the images generated by the simulation image
generating means and by the cause estimating
image generating means; and a display unit for displaying the estimated cause of the
fault and the fault measure simulation value under
the control of the display processing means.

* * * * *

UNITED STATES PATENT AND TRADEMARK OFFICE
CERTIFICATE OF CORRECTION

PATENT NO. : 5,101,337

DATED : March 31, 1992

INVENTOR(S) : Kiyoshi Ebizuka

It is certified that error appears in the above-identified patent and that said Letters Patent is hereby corrected as shown below:

FIG. 8, in box ST5, "MESURE" should be --MEASURE-- as shown on attached sheet.

Column 1, line 17, "diagnosing" should be --estimating-- and "estimating" should be --diagnosing--.

Column 2, line 8, "stimulating" should be --simulating--.

Column 3, line 49, after "value" delete the comma ",".

Column 4, line 4, "characteristic" should be --characteristics--.

Column 5, line 3, delete "claim";
       line 10, "counter measure" should be --counter-measure--;
       line 18, delete "storing";
       line 25, after "detected" insert a period --.--.

Column 6, line 3, "claim 2" should be --the second embodiment--.

Signed and Sealed this

Twenty-first Day of September, 1993

*Attest:*

BRUCE LEHMAN

*Attesting Officer*     *Commissioner of Patents and Trademarks*

FIG. 8